Figure 4:
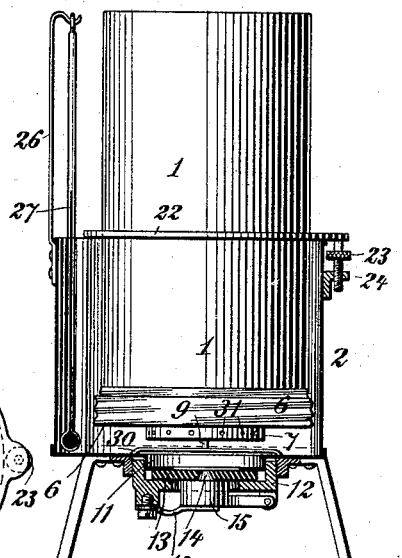

(No Model.) 2 Sheets—Sheet 1.
R. C. CARPENTER.
VISCOSIMETER.
No. 542,604. Patented July 9, 1895.
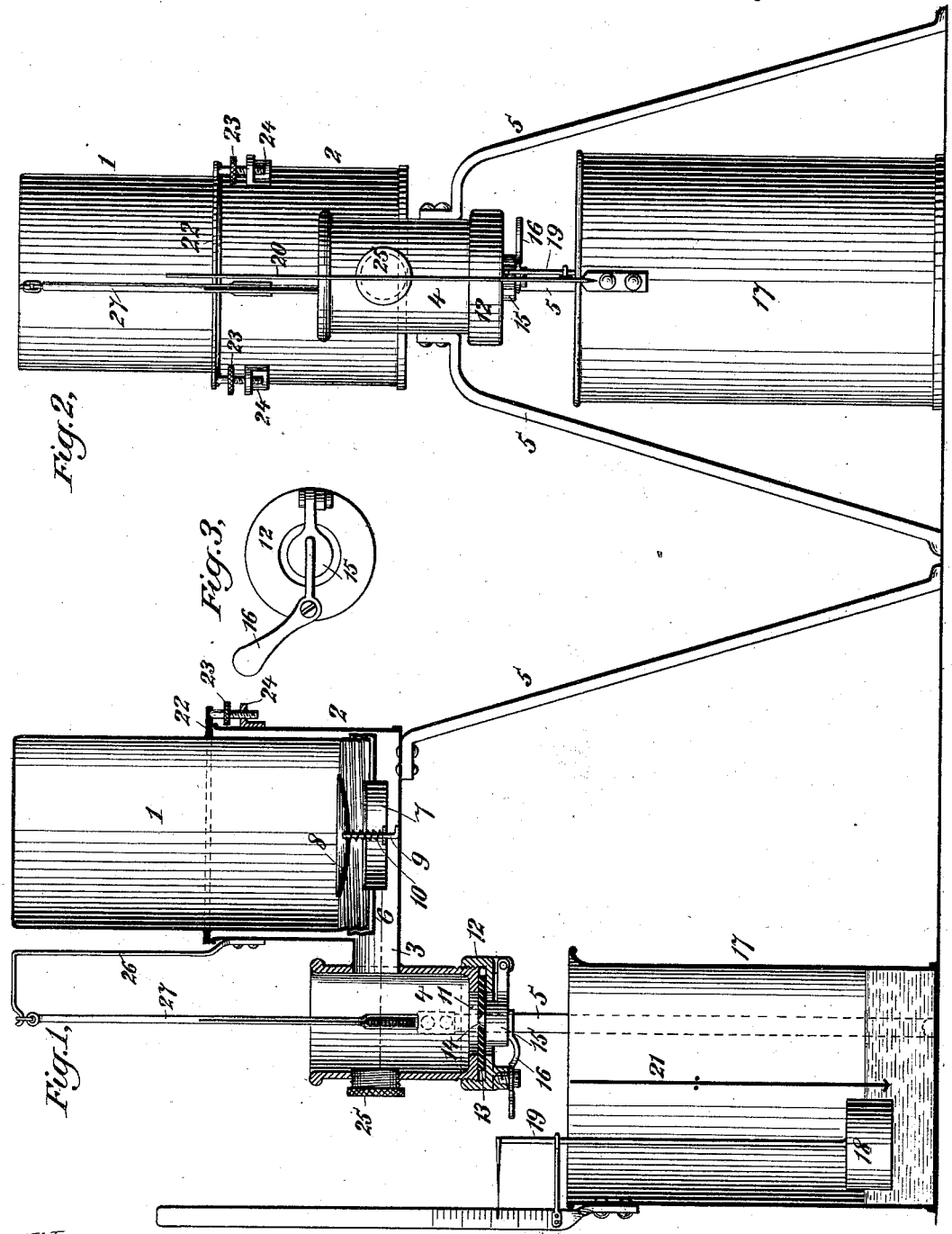
Witnesses:
D. H. Haywood
Henry Hardwicke
Inventor:
Rolla C. Carpenter
By E. M. Marble & Son
His Attorneys (No Model.)  R. C. CARPENTER.  2 Sheets—Sheet 2
VISCOSIMETER.

No. 542,604.  Patented July 9, 1895.

Witnesses:—
D. H. Hayword
Henry Hardwicke

Inventor:—
Rolla C. Carpenter
By E. M. Marble & Son
His Attorneys

UNITED STATES PATENT OFFICE.

ROLLA C. CARPENTER, OF ITHACA, NEW YORK.

VISCOSIMETER.

SPECIFICATION forming part of Letters Patent No. 542,604, dated July 9, 1895.

Application filed July 10, 1894. Serial No. 517,141. (No model.)

*To all whom it may concern:*

Be it known that I, ROLLA C. CARPENTER, a citizen of the United States, residing at Ithaca, in the county of Tompkins and State of New York, have invented certain new and useful Improvements in Viscosimeters; and I do hereby declare the following to be a full, clear, and exact description of the invention, such as will enable others skilled in the art to which it appertains to make and use the same.

My invention relates to viscosimeters or instruments designed to measure the viscosity of oil or other liquids; and my invention consists in the novel means employed for maintaining a constant rate of flow of the liquid while a test is progressing in the novel means employed for regulating the rate of flow and in the novel construction and arrangement of the parts constituting the viscosimeter.

The viscosity of liquids is a property the comparative determination of which is frequently very desirable and important; and this is particularly true with respect to lubricating-oils, since it has been found that the lubricating power of oils is a function of their viscosity. The viscosity of liquids is usually measured by observing the time required for a known quantity of the liquid under test to flow through a standard orifice and comparing the time thus required with the time required by a similar quantity of some standard liquid, such as water, to flow through the same orifice. In order to obtain a uniform rate of flow of the liquid through the aperture throughout the continuance of the test, it is necessary that the pressure or head at the orifice shall be constant throughout the test. Instruments hitherto employed for determining the viscosity of liquids, in which means have been provided for maintaining a constant head throughout the test, have been complicated, bulky, expensive, and difficult to use.

The objects of my invention are, first, to provide an instrument for measuring the viscosity of liquids, which shall maintain automatically a constant pressure or head at the orifice throughout the test; second, to provide an instrument which, while accomplishing the object first named, shall be compact and shall require but a small quantity of liquid for each test, and, third, to make the instrument simple, durable, not liable to derangement, easily operated, and accurate. These objects are attained in the viscosimeter herein described, and illustrated in the drawings which accompany and form a part of this application, in which the same reference-numerals indicate the same or corresponding parts, and in which—

Figure 5:
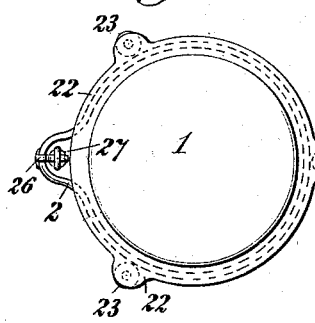

Figure 1 is a sectional elevation of my viscosimeter, showing its construction. Fig. 2 is an end elevation of the viscosimeter. Fig. 3 is a detail view, looking from beneath, of a valve used for closing the measuring-orifice. Fig. 4 is an elevation and partial section of a modified form of viscosimeter, and Fig. 5 is a plan view thereof.

The general plan of my viscosimeter is as follows: From a reservoir containing the specimen of oil or other liquid to be tested a substantially-horizontal passage leads to a smaller cup or receptacle, in the bottom of which is an orifice of standard size through which the liquid may flow into a measuring-vessel. The horizontal passage communicates with the reservoir through an aperture in the bottom of the latter, which is the only aperture in the reservoir, so that air can enter the reservoir only through the aperture through which the liquid escapes. Therefore when the level of the liquid in the cup and passage rises above the opening in the reservoir, no air can enter and the flow of liquid ceases until the level of the liquid again falls below the opening in the bottom of the reservoir, owing to the continual passage of the liquid through the orifice in the bottom of the cup. In practice the regulation thus obtained is quite delicate, and there is scarcely any perceptible variation in the level of the liquid in the cup.

In the drawings, 1 is the reservoir for the oil or other liquid. The lower end of the reservoir is surrounded by a casing 2, in the bottom of which is a passage 3, communicating with a cup 4, in the bottom of which is the measuring-orifice through which the liquid passes. The casing 2 and cup 4 are supported by legs 5 5 or in any other suitable manner.

The bottom of the reservoir 1 is closed by a cap 6, screwed upon or otherwise secured to the reservoir. In this cap is a short nipple 7, forming the aperture through which the liquid flows from the reservoir. The upper end of this nipple is formed into a valve-seat, and a valve 8, guided by a valve-stem 9, is adapted to seat against the end of the nipple. A spring 10 is provided for drawing the valve downward. The length of this valve-stem is such that when the reservoir is in place within the casing 2 the valve-stem presses against the bottom of the casing and keeps the valve open; but when the reservoir is lifted to remove it from the casing this valve immediately is closed by the spring 10, so that liquid in the reservoir will not escape.

In the bottom of the cup 4 is an opening 11. A cap 12 screws upon or is otherwise secured to the bottom of the cup 4 and holds against the bottom of the cup a plate 13 in which is the measuring-orifice 14 through which liquid in the cup 4 will escape. The edges of this orifice 14 may be of various shapes; but I prefer the shape shown, the sides of the orifice flaring outwardly and the upper edge being sharp. This form of orifice I believe to be the best for preventing the formation of drops, which impede the flow of the liquid and so affect the results obtained.

Hinged to the cap 12 and bearing against the bottom of the plate 13 is a valve 15, which is pressed up against the plate 13 by a spring-lever 16. This valve, when in the position shown in the drawings, prevents the escape of liquid from the cup; but when it is desired to permit the liquid to escape, as when an observation is about to be commenced, the lever 16 is moved so as to permit the valve 15 to drop, which it will do of its own weight, thus opening the orifice 14.

Below the cup 4 is placed a measuring-vessel 17 for receiving the liquid as it flows through the orifice 14. This measuring-vessel may be of glass with its sides graduated so as to show the amount of liquid that it contains; but I prefer to use a float 18, having an upwardly-projecting guide rod 19, the end of which is formed into a pointer which moves along a scale 20, upon which at any instant may be read the height of the liquid in the vessel 17. This scale may be graduated according to any convenient scale, such as cubic inches, cubic centimeters, or other convenient unit. To prevent the float from being affected by waves caused by the stream of falling liquid, the vessel 17 is provided with a central partition or baffle-plate 21, suitably supported and extending nearly to the bottom of the vessel, and this plate is arranged to be removed at will to facilitate the cleaning of the vessel 17.

Since the plate 13 containing the measuring-orifice 14 is removable, plates of different materials or plates having different sizes and shapes of orifices may be used interchangeably in the same instrument; and for the same reason it is very easy to grind any orifice to such a size that a definite quantity of some particular liquid will flow through it within a given time; but in order to provide a further more delicate and more easily effected method of adjustment of the rate of flow of liquid through the orifice I provide means for altering at will the head of flow or pressure at the orifice by raising or lowering the reservoir 1 to a slight extent. The reservoir 1 is provided with a flange 22, which rests upon the ends of adjusting-screws 23, passing through brackets 24 which project from the casing 2. By turning these screws 23 the reservoir 1 may be raised or lowered, as desired, thus raising or lowering the level of the surface of the liquid in the cup 4 and passage 3, and thereby altering the head or pressure at the orifice 14. This method of adjustment is found to be very easy and delicate.

In the side of the cup 4 and opposite the mouth of the passage 3 is an aperture closed by the plug 25, for facilitating the cleaning of the passage. In order to measure the temperature of the liquid as it flows through the orifice 14, the casing 2 is provided with a bracket 26, from which a thermometer 27 may be hung so that its bulb will be within the cup 4. It is important to observe the temperature of the liquid, because the viscosity of liquids is greatly affected by the conditions of temperature, and this is particularly true of lubricating-oils. Moreover, it is frequently desirable to test lubricating-oils, especially at temperatures other than atmospheric temperatures. Where this is the case the oil may be heated to the desired temperature before placing it within the reservoir 1, or I may provide the reservoir with a steam-jacket or arrange to place it within an oil-bath; or any other suitable means for heating the liquid after it is within the reservoir may be used.

The operation of my improved viscosimeter is as follows: The reservoir 1 is first taken from the casing 2, inverted, and the cap 6 removed. Into this reservoir is then poured the oil or other liquid which it is desired to test, and where it is desired to conduct the test at a temperature other than atmospheric the oil may be heated to such temperature before pouring it into the reservoir. The cap 6 is then replaced, the reservoir again inverted and placed within the casing 2, the valve 8 preventing the escape of any of the liquid when the reservoir is inverted; but as soon as the valve-stem 9 touches the bottom of the casing, which takes place before the flange 22 of the reservoir is quite in contact with the ends of the adjusting-screws 23, the valve 8 is raised, thus permitting the liquid to flow out into the passage 3 and cup or receptacle 4. In the cup and passage the liquid will accumulate, either because the orifice 14 is closed by the valve 15 or because the liquid flows into the cup more rapidly than it flows out through the orifice; but when the level of the liquid has risen to the height of the dotted line shown in Fig. 1—that is, when the liquid has risen just above the bottom of the nipple 7—the entrance of air to the reservoir is prevented and the escape of the liquid from the reservoir at once ceases. If, now, the lever 16 be turned so as to allow the valve 15 to fall, the orifice 14 is opened and the liquid begins to flow down into the measuring-vessel 17, and as it flows into said measuring-vessel the float 18 rises, the pointer 19 indicating on the scale 20 the amount of liquid that flows into the measuring-vessel. As soon as the liquid has commenced to flow out through the orifice 14 the level of the liquid in the cup 4 and passage 3 will fall, and within a brief instant the level of the liquid will be below the bottom of the nipple 7, so that air may enter the reservoir. Immediately liquid will begin to pass out of the reservoir again, and the level of the liquid in the cup 4 will again rise, shutting off the supply of air as before. In this manner the level of the liquid in the cup 4 and passage 3 constantly fluctuates to a small extent, but this fluctuation is so slight that the level of the liquid, and consequently the pressure or head at the orifice and the rate of flow of the liquid, are all practically constant so long as liquid remains within the reservoir.

The rate of flow of liquid from the reservoir to the cup or receptacle 4 may be controlled by other means than those here shown, as, for instance, by a valve operated by a float within the receptacle 4; but I prefer the means here shown, because of its simplicity, accuracy, and freedom from moving parts.

The viscosimeter is calibrated by determining the time required for a known quantity of some standard liquid—such as water—to flow through the orifice 14. It is desirable that the time required for the water to flow through the orifice shall be so regulated that it may require some convenient number of minutes exactly. This time may be regulated by grinding the orifice 14 to the required size, or the reservoir 1 may be raised or lowered by means of the adjusting-screws 23, as before described, thus changing the height of the liquid in the cup 4.

In Fig. 4 I have illustrated a modified form of viscosimeter, the operation of which is exactly the same as that of the viscosimeter shown in Figs. 1 and 2, but which is somewhat more compact and simple in construction. In this form of viscosimeter the casing 2 itself forms the receptacle into which the liquid from the reservoir 1 flows, and in the bottom of the casing is formed an opening 11, against which the removable plate 13 is held by the screw-cap 12, as in the first form of viscosimeter. The casing 2 is so formed as to permit a thermometer to be inserted between the casing and the reservoir 1 to indicate the temperature of the liquid. The end of the valve-stem 9 is provided with a yoke 30, which bridges across the opening 11, so that the valve may be raised when this yoke comes into contact with the bottom of the casing 1.

The nipple 7, forming the outlet to the reservoir 1, is provided in its sides with small apertures 31, which may be round, as shown, or may be elongated slots. These openings are for the purpose of affording a still more delicate regulation of the height of the liquid in the casing or receptacle 2 than is possible if there be no such openings and the much larger opening in the bottom of the nipple 7 be relied upon. These openings 31 are of such a size that while air will pass through them freely the liquid will pass through them slowly. In the operation of the viscosimeter, when the level of the liquid in the casing or receptacle 2 has reached the level of the mouth of the nipple 7, the flow of liquid will be checked considerably, since now air can enter only through the openings 31, and when the liquid has risen so as to cover these openings the entrance of air will cease, as will the flow of the liquid. A slight fall of the level of the liquid uncovers these holes so that air may enter in a very small quantity and permit more liquid to flow out, which will again cause the apertures 31 to be covered, thus preventing the further entrance of air. This modification may of course be applied to the form of viscosimeter shown in Figs. 1 and 2.

Having thus completely described my improved viscosimeter, what I claim, and desire to secure by Letters Patent, is—

1. In a viscosimeter, the combination, with a reservoir for containing the liquid to be tested, of a receptacle adapted to receive liquid flowing from said reservoir and having a sharp-edged orifice adapted to permit the passage of the liquid, and means for regulating the flow of liquid from the reservoir to said receptacle, substantially as described.

2. In a viscosimeter, the combination, with a reservoir for containing the liquid to be tested, air tight above the level of the liquid in said reservoir, of a receptacle adapted to receive liquid flowing from said reservoir, and having a sharp-edged orifice adapted to permit the passage of the liquid, and a source of air supply for the reservoir arranged to be closed by the rise of liquid within said receptacle, substantially as described.

3. In a viscosimeter, the combination, with a reservoir for containing the liquid to be tested, air tight above the level of the liquid within said reservoir, of a receptacle adapted to receive liquid flowing from said reservoir, and having in its bottom an opening, a removable plate bearing against the bottom of said receptacle and having an orifice for the passage of the liquid, registering with the opening in said receptacle, and a source of air supply for the reservoir arranged to be closed by the rise of liquid within said receptacle, substantially as described.

4. In a viscosimeter, the combination, with a reservoir for containing the liquid to be tested, of a receptacle arranged to receive liquid flowing from said reservoir, and having an opening for permitting the escape of the liquid therefrom, a removable plate covering the opening and having an orifice for the passage of the liquid, and means for regulating the flow of liquid from said reservoir to said receptacle, substantially as described.

5. In a viscosimeter, the combination, with a reservoir for containing the liquid to be tested, of a receptacle arranged to receive liquid flowing from said reservoir, and having an opening for permttting the escape of the liquid therefrom, a removable plate covering said opening and having an orifice for the passage of the liquid, a valve for closing said orifice, and means for regulating the flow of liquid from said reservoir to said receptacle, substantially as described.

6. In a viscosimeter, the combination, with a reservoir for containing the liquid to be tested, of a receptacle arranged to receive liquid flowing from said reservoir, and having an opening for permitting the escape of the liquid therefrom, a screw-cap screwing upon said receptacle and holding a removable plate against the sides of the opening in said receptacle, said plate having an orifice for the passage of the liquid, a valve carried by said screw-cap and adapted to close the orifice in said plate, and means for regulating the flow of liquid from said reservoir to said receptacle, substantially as described.

7. In a viscosimeter, the combination, with a reservoir for containing the liquid to be tested, air tight above the level of the liquid in said reservoir, and a suitable support for such reservoir, of a receptacle adapted to receive liquid flowing from said reservoir, and having a means for permitting the escape of the liquid therefrom, a source of air supply for the reservoir arranged to be closed by the rise of the liquid within said reservoir, and means for adjusting the height of such source of air supply with reference to said receptacle, substantially as described.

8. In a viscosimeter, the combination, with a reservoir for containing the liquid to be tested, air tight above the level of the liquid in said reservoir, and a suitable support for such reservoir, of a receptacle adapted to receive liquid flowing from said reservoir, and having a means for permitting the escape of the liquid therefrom, a source of air supply for the reservoir arranged to be closed by the rise of the liquid within said receptacle, and means for adjusting the height of said reservoir with reference to said receptacle, substantially as described.

In testimony whereof I affix my signature in presence of two witnesses.

ROLLA C. CARPENTER.

Witnesses:
THOS. B. DIXON,
CHAUNCEY P. OVERFIELD.